United States Patent
Chien

(10) Patent No.: US 10,180,589 B2
(45) Date of Patent: Jan. 15, 2019

(54) DISPLAY UNIT PROCESS CONTROL METHOD AND SYSTEM

(71) Applicants: HKC Corporation Limited, Shenzhen, Guangdong (CN); Chongqing HKC Optoelectronics Technology Co., Ltd., Chongqing (CN)

(72) Inventor: Chung-Kuang Chien, Chongqing (CN)

(73) Assignees: HKC Corporation Limited, Shenzhen, Guangdong (CN); Chongqing HKC Optoelectronics Technology Co., Ltd., Chongqing (CN)

(*) Notice: Subject to any disclaimer, the term of this patent is extended or adjusted under 35 U.S.C. 154(b) by 0 days.

(21) Appl. No.: 15/578,656

(22) PCT Filed: Aug. 16, 2017

(86) PCT No.: PCT/CN2017/097605
§ 371 (c)(1),
(2) Date: Nov. 30, 2017

(87) PCT Pub. No.: WO2018/166140
PCT Pub. Date: Sep. 20, 2018

(65) Prior Publication Data
US 2018/0292686 A1    Oct. 11, 2018

(30) Foreign Application Priority Data

Mar. 14, 2017  (CN) .......................... 2017 1 0149493

(51) Int. Cl.
*G02F 1/13*    (2006.01)
*G09G 3/36*    (2006.01)

(52) U.S. Cl.
CPC ......... *G02F 1/1309* (2013.01); *G09G 3/3648* (2013.01); *G09G 2300/0408* (2013.01)

(58) Field of Classification Search
CPC .................................................... G02F 1/1309
See application file for complete search history.

(56) References Cited

FOREIGN PATENT DOCUMENTS

| | | |
|---|---|---|
| CN | 2470821 Y | 1/2002 |
| CN | 1677182 A | 10/2005 |
| CN | 101169528 A | 4/2008 |
| CN | 101334542 A | 12/2008 |
| CN | 204314565 U | 5/2015 |
| CN | 205879105 U | 1/2017 |
| CN | 106646957 A | 5/2017 |
| KR | 20080052951 A | 6/2008 |

*Primary Examiner* — Joseph L Williams
(74) *Attorney, Agent, or Firm* — Muncy, Geissler, Olds & Lowe, P.C.

(57) ABSTRACT

This application provides a display unit process control method and system. Before a first substrate and a second substrate enter a display unit process, according to quantities of uncertified chips on a first substrate and a second substrate, a first substrate and a second substrate which quantities of uncertified chips are less than preset quantities are selected as a certified first substrate and a certified second substrate; the certified first substrate and the certified second substrate are divided into a plurality of sorting levels according to locations of the uncertified chips on the first substrate and the second substrate; pairing and combination are performed on the first substrate and the second substrate according to the sorting levels in the display unit process; and a paired combination with a high matching degree is selected to enter an assembly process.

20 Claims, 4 Drawing Sheets

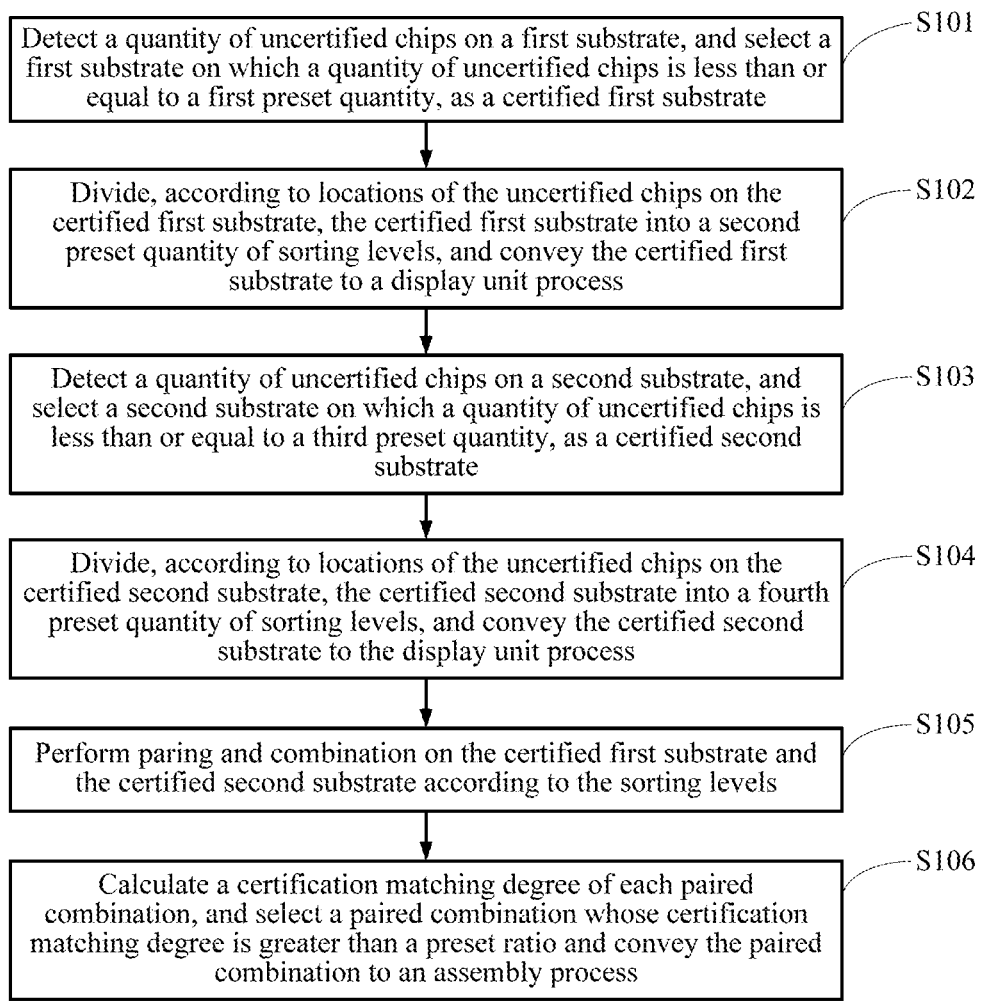

DISPLAY UNIT PROCESS CONTROL METHOD AND SYSTEM

BACKGROUND

Technical Field

Embodiments of this application relate to the field of liquid crystal panel manufacturing technologies, and in particular, to a display unit process control method and system.

Related Art

The continuous development of liquid crystal display technologies is accompanied with continuous upgrade and improvement of liquid crystal panel manufacturing technologies; and liquid crystal panels are widely applied to televisions, display screens in large meetings, personal computer (PC) displays, and other fields because of good display effects of the liquid crystal panels. To manufacture a liquid crystal panel, a liquid crystal substrate needs to be manufactured first. A common liquid crystal substrate manufacturing process generally includes a first substrate process, a second substrate process, and a display unit process (that is, an attaching process of a thin film transistor (TFT) glass substrate and a second substrate).

However, in an existing display unit process, a case in which a certified chip on a first substrate conveyed in a first substrate process is paired and assembled with an uncertified chip on a second substrate conveyed in a second substrate process often occurs. Consequently, a certification rate of liquid crystal substrates produced in the display unit process is greatly lowered, greatly lowering production efficiency, and causing a severe waste of costs.

SUMMARY

Embodiments of this application provide a display unit process control method and system, so as to greatly increase a certification rate in a display unit process, thereby effectively improving production efficiency and reducing manufacturing costs.

An aspect of the embodiments of this application provides a display unit process control method, comprising:

detecting a quantity of uncertified chips on a first substrate, and selecting the first substrate which a quantity of uncertified chips is less than or equal to a first preset quantity, as a certified first substrate;

dividing the certified first substrate into a second preset quantity of sorting levels according to locations of the uncertified chips on the certified first substrate, and conveying the certified first substrate to a display unit process;

detecting a quantity of uncertified chips on a second substrate, and selecting the second substrate which a quantity of uncertified chips is less than or equal to a third preset quantity, as a certified second substrate;

dividing the certified second substrate into a fourth preset quantity of sorting levels according to locations of the uncertified chips on the certified second substrate, and conveying the certified second substrate to the display unit process;

performing paring and combination on the certified first substrate and the certified second substrate according to the sorting levels; and calculating a certification matching degree of each paired combination, and selecting a paired combination whose certification matching degree is greater than a preset ratio and conveying the paired combination to an assembly process.

In an embodiment, the performing paring and combination on the certified first substrate and the certified second substrate according to the sorting levels comprises:

performing paring and combination on the certified first substrate and the certified second substrate having a same sorting level.

In an embodiment, the first preset quantity is associated with the second preset quantity.

In an embodiment, the first preset quantity is defined to be N, and the second preset quantity is defined to be M, where $0 \leq N \leq K$, $M \geq 1$, M, N, and K are all integers, and K is a quantity of chips on the first substrate; and an association relationship between the first preset quantity and the second preset quantity is: $M = C_K^0 + C_K^1 + \ldots + C_K^N$.

In an embodiment, the first preset quantity is two.

In an embodiment, the third preset quantity is associated with the fourth preset quantity.

In an embodiment, the third preset quantity is defined to be n, and the fourth preset quantity is defined to be m, where $0 \leq n \leq Q$, $m \geq 1$, m, n, and Q are all integers, and Q is a quantity of chips on the second substrate; and an association relationship between the third preset quantity and the fourth preset quantity is: $m = C_Q^0 - C_Q^1 + \ldots + C_Q^n$.

In an embodiment, the third preset quantity is one.

In an embodiment, after the calculating a certification matching degree of each paired combination, and selecting a paired combination whose certification matching degree is greater than a preset ratio and conveying the paired combination to an assembly process, the method further comprises: performing rejection processing on or taking measures to recover and repair a paired combination whose certification matching degree is less than or equal to the preset ratio.

Another aspect of the embodiments of this application further provides a display unit process control system, comprising:

a first substrate yield rate detection unit, configured to: detect a quantity of uncertified chips on a first substrate, and select the first substrate which a quantity of uncertified chips is less than or equal to a first preset quantity, as a certified first substrate;

a first substrate level division unit, configured to: divide the certified first substrate into a second preset quantity of sorting levels according to locations of the uncertified chips on the certified first substrate, and convey the certified first substrate to a display unit process;

a second substrate yield rate detection unit, configured to: detect a quantity of uncertified chips on a second substrate, and select the second substrate which a quantity of uncertified chips is less than or equal to a third preset quantity, as a certified second substrate;

a second substrate level division unit, configured to: divide the certified second substrate into a fourth preset quantity of sorting levels according to locations of the uncertified chips on the certified second substrate, and convey the certified second substrate to the display unit process;

a pairing and combination unit, configured to perform paring and combination on the certified first substrate and the certified second substrate according to the sorting levels; and a matching degree calculation unit, configured to: calculate a certification matching degree of each paired combination, and select a paired combination whose certification matching degree is greater than a preset ratio and convey the paired combination to an assembly process.

In an embodiment, a chip on the second substrate is a color filter.

In an embodiment, the pairing and combination unit is specifically configured to: perform paring and combination on the certified first substrate and the certified second substrate having a same sorting level.

In an embodiment, the first preset quantity is associated with the second preset quantity.

In an embodiment, the first preset quantity is defined to be N, and the second preset quantity is defined to be M, where $0 \leq N \leq K$, $M \geq 1$, M, N, and K are all integers, and K is a quantity of chips on the first substrate; and an association relationship between the first preset quantity and the second preset quantity is: $M=C_K^0+C_K^1+ \ldots +C_K^N$.

In an embodiment, the first preset quantity is two.

In an embodiment, the third preset quantity is associated with the fourth preset quantity.

In an embodiment, the third preset quantity is defined to be n, and the fourth preset quantity is defined to be m, where $0 \leq n \leq Q$, $m \geq 1$, m, n, and Q are all integers, and Q is a quantity of chips on the second substrate; and an association relationship between the third preset quantity and the fourth preset quantity is: $m=C_Q^0+C_Q^1+ \ldots +C_Q^n$.

In an embodiment, the third preset quantity is one.

In an embodiment, the matching degree calculation unit is specifically configured to: perform rejection processing on or take measures to recover and repair a paired combination whose certification matching degree is less than or equal to the preset ratio.

An embodiment of this application further provides another display unit process control system, comprising:

a first substrate yield rate detection unit, configured to: detect a quantity of uncertified chips on a first substrate, and select the first substrate which a quantity of uncertified chips is less than or equal to a first preset quantity, as a certified first substrate;

a first substrate level division unit, configured to: divide the certified first substrate into a second preset quantity of sorting levels according to locations of the uncertified chips on the certified first substrate, and convey the certified first substrate to a display unit process;

a second substrate yield rate detection unit, configured to: detect a quantity of uncertified chips on a second substrate, and select the second substrate which a quantity of uncertified chips is less than or equal to a third preset quantity, as a certified second substrate;

a second substrate level division unit, configured to: divide the certified second substrate into a fourth preset quantity of sorting levels according to locations of the uncertified chips on the certified second substrate, and convey the certified second substrate to the display unit process;

a pairing and combination unit, configured to perform paring and combination on the certified first substrate and the certified second substrate according to the sorting levels; and a matching degree calculation unit, configured to: calculate a certification matching degree of each paired combination, and select a paired combination whose certification matching degree is greater than a preset ratio and convey the paired combination to an assembly process, where the first substrate and the second substrate are manufactured and formed by arranging a plurality of chips in a form of an array, a chip on the first substrate is a TFT glass substrate, and a chip on the second substrate is a color filter.

The embodiments of this application provide the display unit process control method and system. Before a first substrate and a second substrate enter a display unit process, according to quantities of uncertified chips on a first substrate and a second substrate, a first substrate and a second substrate on which quantities of uncertified chips are less than preset quantities are selected as a certified first substrate and a certified second substrate; the certified first substrate and the certified second substrate are divided into a plurality of sorting levels according to locations of the uncertified chips on the first substrate and the second substrate; pairing and combination are performed on the first substrate and the second substrate according to the sorting levels in the display unit process; and a paired combination with a high matching degree is selected and injected into a liquid crystal to manufacture a liquid crystal substrate, so as to greatly increase a certification rate in the display unit process, thereby effectively improving production efficiency and reducing manufacturing costs.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following descriptions show some embodiments of this application, and a person of ordinary skill in the art may still derive other drawings from these accompanying drawings without creative efforts.

FIG. 1 is a block diagram of a procedure of a display unit process control method according to an embodiment of this application;

FIG. 2 is a schematic structural diagram of a first substrate according to an embodiment of this application;

Figures 3, 4:
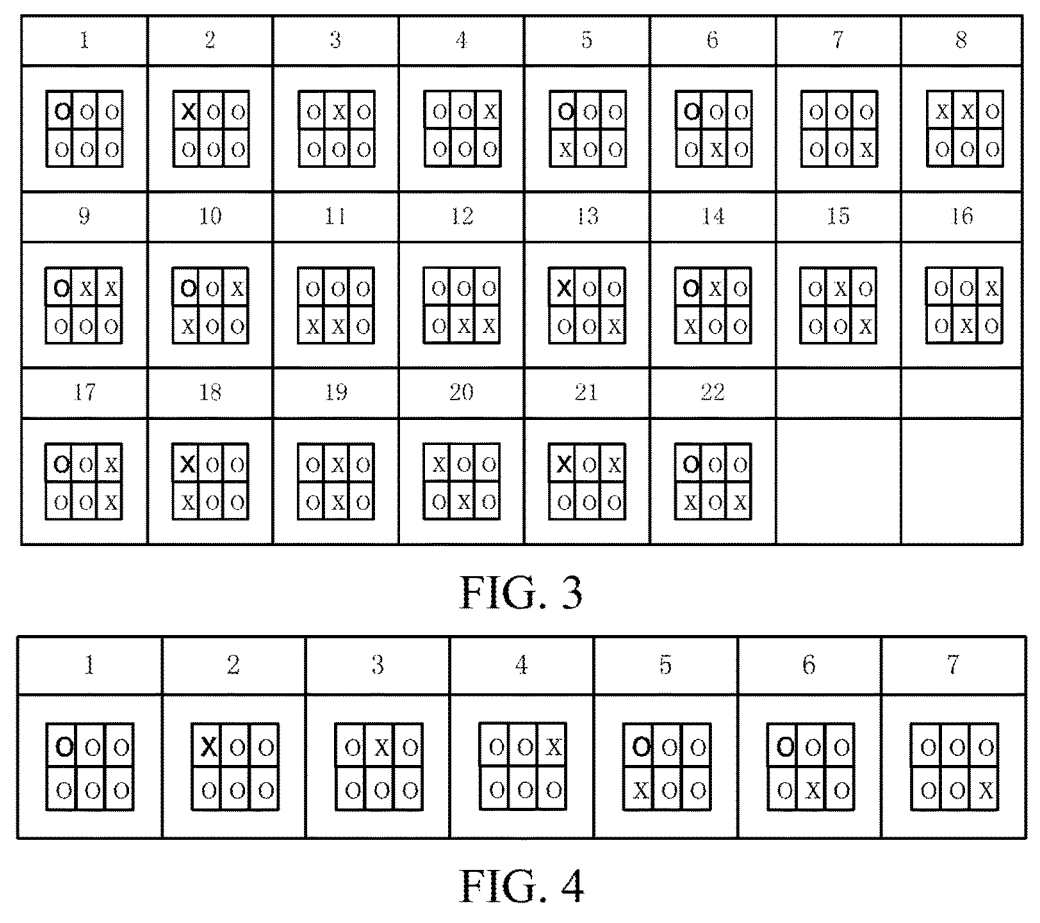

FIG. 3 is a schematic diagram of sorting levels of a certified first substrate according to an embodiment of this application;

FIG. 4 is a schematic diagram of sorting levels of a certified second substrate according to an embodiment of this application;

DETAILED DESCRIPTION

Figure 5:
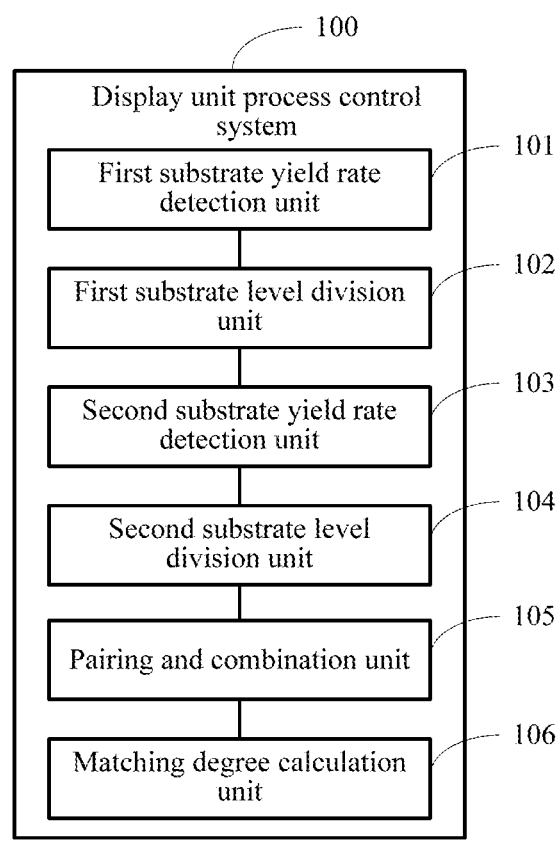
FIG. 5 is a structural block diagram of a display unit process control system according to an embodiment of this application.

To make a person skilled in the art better understand the solutions of this application, the following clearly describes the technical solutions in the embodiments of this application with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

In addition, the term "including" and any other variant thereof in the specification, claims, and the accompanying drawings of this application are intended to cover a non-exclusive inclusion. For example, a process, a method, a system, a product, or a device including a series of steps or units is not limited to the listed steps or units, but optionally further includes an unlisted step or unit, or optionally further includes another inherent step or unit of the process, the method, the product, or the device. In addition, the terms "first", "second", "third", and the like are intended to distinguish between different objects but do not indicate a particular order.

As shown in FIG. 1, an embodiment of this application provides a display unit process control method. In an embodiment of this application, a display unit may be a liquid crystal display panel, an OLED panel, or another display unit having a display function. The display unit process control method provided in this embodiment may specifically include the following steps:

Step S101: Detect a quantity of uncertified chips on a first substrate, and select the first substrate which a quantity of uncertified chips is less than or equal to a first preset quantity, as a certified first substrate.

In an embodiment of this application, the first substrate may be a glass substrate or a plastic substrate or may be made of another substrate material, and a type of the first substrate is not particularly limited herein.

In this embodiment, the first substrate in step S101 specifically has a structure of a large array substrate manufactured and formed by arranging a plurality of chips in a form of an array. In a specific application, usually, six, eight, or 18 chips are manufactured together. A specific quantity of chips on the first substrate may be determined according to an actual requirement. In an embodiment, a chip on the first substrate may be specifically a TFT glass substrate.

FIG. 2 shows a structure of a large array substrate formed by manufacturing six chips together, where X indicates an uncertified chip (that is, a chip not conforming to a use standard), and O indicates a certified chip (that is, a chip conforming to a use standard). The figure exemplarily shows a case in which a TFT glass substrate at the upper left corner is an uncertified chip.

In a specific application, the first preset quantity may be set in a user-defined manner according to a manufacturing requirement. If there is a relatively high requirement for a certification rate of the first substrate, the first preset quantity may be set to a relatively small value; otherwise, the first preset quantity may be set to a relatively large value.

In an embodiment, the first preset quantity may be specifically two. That is, a first substrate is used as a certified first substrate only when it is detected that a quantity of uncertified chips on the first substrate is less than or equal to two.

Step S102: Divide the certified first substrate into a second preset quantity of sorting levels according to locations of the uncertified chips on the certified first substrate, and convey the certified first substrate to a display unit process.

In a specific application, the first preset quantity is associated with the second preset quantity (that is, there is an association relationship between a quantity of uncertified chips in a plurality of chips and a quantity of locations of the uncertified chips). A specific association relationship is as follows:

The first preset quantity is defined to be N, and the second preset quantity is defined to be M, where $0 \leq N \leq K$, $M \geq 1$, M, N, and K are all integers, and K is a quantity of chips on the first substrate; and an association relationship between the first preset quantity and the second preset quantity is: $M = C_K^0 + C_K^1 + \ldots + C_K^N$.

For a first substrate including six TFT glass substrates, if the first preset quantity is two, the second preset quantity is 22 (that is, when a quantity of uncertified chips in the six chips is less than or equal to two, there are 22 locations of the uncertified chips on the certified first substrate).

FIG. 3 is a schematic diagram of a level division status when the first preset quantity is two, for a first substrate including six chips, the certified first substrate is divided into 22 levels according to locations of uncertified chips on the certified first substrate. In the figure, X indicates an uncertified chip, and O indicates a certified chip.

Step S103: Detect a quantity of uncertified chips on a second substrate, and select the second substrate which a quantity of uncertified chips is less than or equal to a third preset quantity, as a certified second substrate.

In this embodiment, the second substrate in step S103 specifically has a structure of a large second substrate manufactured and formed by arranging a plurality of chips in a form of an array, and the structure is the same as the structure shown in FIG. 2; and a schematic diagram is not provided herein separately. In an embodiment, a chip on the second substrate may be specifically a color filter.

In a specific application, the third preset quantity may be set in a user-defined manner according to a manufacturing requirement. If there is a relatively high requirement for a certification rate of the second substrate, the third preset quantity may be set to a relatively small value; otherwise, the third preset quantity may be set to a relatively large value.

Step S104: Divide the certified second substrate into a fourth preset quantity of sorting levels according to locations of the uncertified chips on the certified second substrate, and convey the certified second substrate to the display unit process.

In a specific application, the second substrate is a large substrate formed by arranging a plurality of chips in a form of an array. The third preset quantity is associated with the fourth preset quantity (that is, there is an association relationship between a quantity of uncertified chips in a plurality of chips and a quantity of locations of the uncertified chips). A specific association relationship is as follows:

The third preset quantity is defined to be n, and the fourth preset quantity is defined to be m, where $0 \leq n \leq Q$, $m \geq 1$, m, n, and Q are all integers, and Q is a quantity of chips on the second substrate; and an association relationship between the third preset quantity and the fourth preset quantity is: $m = C_Q^0 + C_Q^1 + \ldots + C_Q^n$.

If the third preset quantity is one, the fourth preset quantity is seven (that is, when a quantity of uncertified chip in a plurality of chips is less than or equal to one, there are seven locations of the uncertified chips on the certified second substrate).

FIG. 4 is a schematic diagram of a level division status when the third preset quantity is one, for a second substrate including six chips, the certified second substrate is divided into seven levels according to locations of uncertified chips on the certified second substrate. In the figure, X indicates an uncertified chip, and O indicates a certified chip.

Step S105: Perform paring and combination on the certified first substrate and the certified second substrate according to the sorting levels.

In a specific application, step S105 specifically includes:

Step S201: Perform paring and combination on the certified first substrate and the certified second substrate having a same sorting level.

In a specific application, step S201 is specifically performing pairing and combination on uncertified chips having same locations on the certified first substrate and the certified second substrate, and correspondingly, performing pairing and combination on certified chips having same locations on the certified first substrate and the certified second substrate. After an assembly process is completed, a large panel including six substrate combinations may be divided, and then, for each obtained substrate combination, certified chips are attached together and uncertified chips are attached together, so as to effectively avoid a case of attaching an uncertified chip to a certified chip, thereby avoiding a waste of production costs, and increasing a certification rate in the display unit process.

In an embodiment of this application, a substrate combination may be specifically a liquid crystal substrate.

Step S106: Calculate a certification matching degree of each paired combination, and select a paired combination whose certification matching degree is greater than a preset ratio and convey the paired combination to an assembly process.

In a specific application, the preset ratio may be selected according to an actual requirement, and a higher ratio indicates a higher certification rate in the display unit process. The paired combination whose certification matching degree is greater than the preset ratio is selected and conveyed to the assembly process, so as to effectively avoid assembly of a paired combination with a relatively low matching degree, thereby achieving an objective of reducing materials and reducing costs, and also avoid a waste of a manufacturing time, thereby improving production efficiency.

In an embodiment, after step S106, the method further includes: performing rejection processing on or taking measures to recover and repair a paired combination whose certification matching degree is less than or equal to the preset ratio.

In this embodiment, before a first substrate and a second substrate enter a display unit process, according to quantities of uncertified chips on the first substrate and the second substrate, the first substrate and the second substrate are divided into a plurality of sorting levels; pairing and combination are performed on the first substrate and the second substrate according to the sorting levels in the display unit process; and a paired combination with a high matching degree is selected to enter an assembly process, so as to greatly increase a certification rate in the display unit process, thereby effectively improving production efficiency and reducing manufacturing costs.

As shown in FIG. 2, an embodiment of this application provides a display unit process control system 100, configured to perform steps in the method in the embodiment corresponding to FIG. 1, and including:

a first substrate yield rate detection unit 101, configured to: detect a quantity of uncertified chips on a first substrate, and select the first substrate on which a quantity of uncertified chips is less than or equal to a first preset quantity, as a certified first substrate;

a first substrate level division unit 102, configured to: divide the certified first substrate into a second preset quantity of sorting levels according to locations of the uncertified chips on the certified first substrate, and convey the certified first substrate to the display unit process;

a second substrate yield rate detection unit 103, configured to: detect a quantity of uncertified chips on a second substrate, and select the second substrate on which a quantity of uncertified chips is less than or equal to a third preset quantity, as a certified second substrate;

a second substrate level division unit 104, configured to: divide the certified second substrate into a fourth preset quantity of sorting levels according to locations of the uncertified chips on the certified second substrate, and convey the certified second substrate to the display unit process;

a pairing and combination unit 105, configured to perform paring and combination on the certified first substrate and the certified second substrate according to the sorting levels; and a matching degree calculation unit 106, configured to: calculate a certification matching degree of each paired combination, and select a paired combination whose certification matching degree is greater than a preset ratio and convey the paired combination to an assembly process.

In an embodiment, the pairing and combination unit 105 is specifically configured to:

perform paring and combination on the certified first substrate and the certified second substrate having a same sorting level.

In a specific application, the display unit process control system 100 provided in this embodiment may be a software program stored in a manufacturing execution system (MES) applied to liquid crystal manufacturing, and each unit is a program unit in the software program.

In an embodiment of this application, the first preset quantity is associated with the second preset quantity, and the third preset quantity is associated with the fourth preset quantity.

In an embodiment of this application, the first preset quantity is defined to be N, and the second preset quantity is defined to be M, where $0 \leq N \leq K$, $M \geq 1$, M, N, and K are all integers, and K is a quantity of chips on the first substrate; and an association relationship between the first preset quantity and the second preset quantity is: $M = C_K^0 + C_K^1 + \ldots + C_K^N$; and the third preset quantity is defined to be n, and the fourth preset quantity is defined to be m, where $0 \leq n \leq Q$, $m \geq 1$, m, n, and Q are all integers, and Q is a quantity of chips on the second substrate; and an association relationship between the third preset quantity and the fourth preset quantity is: $m = C_Q^0 + C_Q^1 + \ldots + C_Q^n$.

In an embodiment of this application, the first preset quantity is two, and the third preset quantity is one.

In this embodiment, before a first substrate and a second substrate enter a display unit process, according to quantities of uncertified chips on the first substrate and the second substrate, the first substrate and the second substrate are divided into a plurality of sorting levels; pairing and combination are performed on the first substrate and the second substrate according to the sorting levels in the display unit process; and a paired combination with a high matching degree is selected to enter an assembly process, so as to greatly increase a certification rate in the display unit process, thereby effectively improving production efficiency and reducing manufacturing costs.

Figure 6:
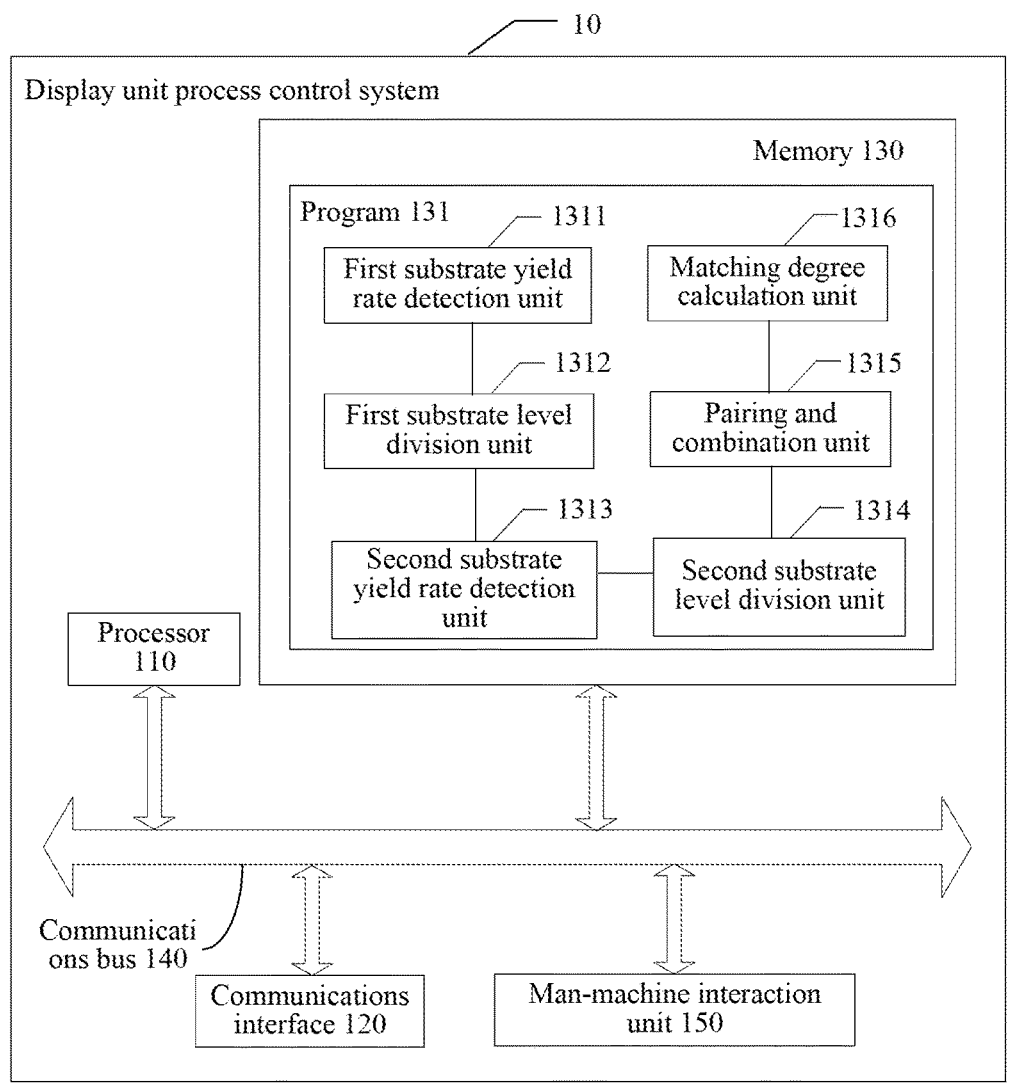
FIG. 6 is a structural block diagram of a display unit process control system according to an embodiment of this application.

As shown in FIG. 6, an embodiment of this application provides a display unit process control system 10, including:

a processor 110, a communications interface 120, a memory 130, a bus 140, and a man-machine interaction unit 150.

The processor 110, the communications interface 120, the memory 130, and the man-machine interaction unit 150 complete mutual communication by using the bus 140.

The communications interface 120 is configured to communicate with an external device such as a PC or a smartphone.

The processor 110 is configured to execute a program 131.

In a specific application, the man-machine interaction unit 150 may include a keyboard, a touch display panel, a mouse, a physical or virtual button, or the like, and is used by an operator to input corresponding data.

Specifically, the program 131 may include program code, where the program code includes a computer operation instruction.

The processor 110 may be a central processing unit (CPU) or an application-specific integrated circuit (ASIC), or one or more integrated circuits configured to implement the embodiments of this application.

The memory 130 is configured to store the program 131. The memory 130 may include a high-speed random access memory (RAM), and may also include a non-volatile memory such as at least one magnetic disk storage. The program 131 may specifically include:

a first substrate yield rate detection unit 1311, configured to: detect a quantity of uncertified chips on a first substrate, and select the first substrate which a quantity of uncertified chips is less than or equal to a first preset quantity, as a certified first substrate;

a first substrate level division unit 1312, configured to: divide the certified first substrate into a second preset quantity of sorting levels according to locations of the uncertified chips on the certified first substrate, and convey the certified first substrate to the display unit process;

a second substrate yield rate detection unit 1313, configured to: detect a quantity of uncertified chips on a second substrate, and select the second substrate on which a quantity of uncertified chips is less than or equal to a third preset quantity, as a certified second substrate;

a second substrate level division unit 1314, configured to: divide the certified second substrate into a fourth preset quantity of sorting levels according to locations of the uncertified chips on the certified second substrate, and convey the certified second substrate to the display unit process;

a pairing and combination unit 1315, configured to perform paring and combination on the certified first substrate and the certified second substrate according to the sorting levels; and a matching degree calculation unit 1316, configured to: calculate a certification matching degree of each paired combination, and select a paired combination whose certification matching degree is greater than a preset ratio and convey the paired combination to an assembly process.

In an embodiment, the pairing and combination unit is specifically configured to:

perform paring and combination on the certified first substrate and the certified second substrate having a same sorting level.

Units in all embodiments of this application may be implemented by a universal integrated circuit such as a CPU or an ASIC.

For steps in the method in the embodiment of this application, order adjustment, combination, and deletion may be performed according to an actual requirement.

Units in an apparatus in the embodiment of this application may be combined, divided, and deleted according to an actual requirement.

A person of ordinary skill in the art may understand that all or some of the processes of the methods in the embodiments may be implemented by a computer program instructing relevant hardware. The program may be stored in a computer-readable storage medium. When the program runs, the processes in the embodiments of the methods are performed. The storage medium may be: a magnetic disk, an optical disc, a read-only memory (ROM), a RAM, or the like.

The foregoing descriptions are merely exemplary embodiments of this application, but are not intended to limit this application. Any modification, equivalent replacement, or improvement made without departing from the spirit and principle of this application should fall within the protection scope of this application.

What is claimed is:

1. A display unit process control method, comprising:

detecting a quantity of uncertified chips on a first substrate, and selecting the first substrate which the quantity of uncertified chips is less than or equal to a first preset quantity, as a certified first substrate;

dividing the certified first substrate into a second preset quantity of sorting levels according to a locations of the uncertified chips on the certified first substrate, and conveying the certified first substrate to a display unit process;

detecting a quantity of uncertified chips on a second substrate, and selecting the second substrate which a quantity of uncertified chips is less than or equal to a third preset quantity, as a certified second substrate;

dividing the certified second substrate into a fourth preset quantity of sorting levels according to a locations of the uncertified chips on the certified second substrate, and conveying the certified second substrate to the display unit process;

performing paring and combination on the certified first substrate and the certified second substrate according to the sorting levels; and calculating a certification matching degree of each paired combination, and selecting a paired combination whose certification matching degree is greater than a preset ratio and conveying the paired combination to an assembly process.

2. The display unit process control method according to claim 1, wherein the performing paring and combination on the certified first substrate and the certified second substrate according to the sorting levels comprises: performing paring and combination on the certified first substrate and the certified second substrate having a same sorting level.

3. The display unit process control method according to claim 1, wherein the first preset quantity is associated with the second preset quantity.

4. The display unit process control method according to claim 3, wherein the first preset quantity is defined to be N, and the second preset quantity is defined to be M, wherein $0 \leq N \leq K$, $M \geq 1$, M, N, and K are all integers, and K is a quantity of chips on the first substrate; and an association relationship between the first preset quantity and the second preset quantity is: $M = C_K^0 + C_K^1 + \ldots + C_K^N$.

5. The display unit process control method according to claim 4, wherein the first preset quantity is two.

6. The display unit process control method according to claim 1, wherein the third preset quantity is associated with the fourth preset quantity.

7. The display unit process control method according to claim 6, wherein the third preset quantity is defined to be n, and the fourth preset quantity is defined to be m, wherein $0 \leq n \leq Q$, $m \geq 1$, m, n, and Q are all integers, and Q is a quantity of chips on the second substrate; and an association relationship between the third preset quantity and the fourth preset quantity is: $m = C_Q^0 + C_Q^1 + \ldots + C_Q^n$.

8. The display unit process control method according to claim 7, wherein the third preset quantity is one.

9. The display unit process control method according to claim 1, wherein after the calculating a certification matching degree of each paired combination, and selecting a paired combination whose certification matching degree is greater than a preset ratio and conveying the paired combination to an assembly process, the method further comprises: performing rejection processing on or taking measures to recover and repair a paired combination whose certification matching degree is less than or equal to the preset ratio.

10. A display unit process control system, comprising:
a first substrate yield rate detection unit, configured to: detect a quantity of uncertified chips on a first substrate, and select the first substrate which the quantity of uncertified chips is less than or equal to a first preset quantity, as a certified first substrate;
a first substrate level division unit, configured to: divide the certified first substrate into a second preset quantity of sorting levels according to locations of the uncertified chips on the certified first substrate, and convey the certified first substrate to a display unit process;
a second substrate yield rate detection unit, configured to: detect a quantity of uncertified chips on a second substrate, and select the second substrate which a quantity of uncertified chips is less than or equal to a third preset quantity, as a certified second substrate;
a second substrate level division unit, configured to: divide the certified second substrate into a fourth preset quantity of sorting levels according to locations of the uncertified chips on the certified second substrate, and convey the certified second substrate to the display unit process;
a pairing and combination unit, configured to perform paring and combination on the certified first substrate and the certified second substrate according to the sorting levels; and
a matching degree calculation unit, configured to: calculate a certification matching degree of each paired combination, and select a paired combination whose certification matching degree is greater than a preset ratio and convey the paired combination to an assembly process.

11. The display unit process control system according to claim 10, wherein a chip on the second substrate is a color filter.

12. The display unit process control system according to claim 10, wherein the pairing and combination unit is specifically configured to: perform paring and combination on the certified first substrate and the certified second substrate having a same sorting level.

13. The display unit process control system according to claim 10, wherein the first preset quantity is associated with the second preset quantity.

14. The display unit process control system according to claim 13, wherein the first preset quantity is defined to be N, and the second preset quantity is defined to be M, wherein $0 \leq N \leq K$, $M \geq 1$, M, N, and K are all integers, and K is a quantity of chips on the first substrate; and an association relationship between the first preset quantity and the second preset quantity is: $M = C_K^0 + C_K^1 + \ldots + C_K^N$.

15. The display unit process control system according to claim 14, wherein the first preset quantity is two.

16. The display unit process control system according to claim 10, wherein the third preset quantity is associated with the fourth preset quantity.

17. The display unit process control system according to claim 16, wherein the third preset quantity is defined to be n, and the fourth preset quantity is defined to be m, wherein $0 \leq n \leq Q$, $m \geq 1$, m, n, and Q are all integers, and Q is a quantity of chips on the second substrate; and an association relationship between the third preset quantity and the fourth preset quantity is: $m = C_Q^0 + C_Q^1 + \ldots + C_Q^n$.

18. The display unit process control system according to claim 17, wherein the third preset quantity is one.

19. The display unit process control system according to claim 10, wherein the matching degree calculation unit is specifically configured to: perform rejection processing on or take measures to recover and repair a paired combination whose certification matching degree is less than or equal to the preset ratio.

20. A display unit process control system, comprising:
a first substrate yield rate detection unit, configured to: detect a quantity of uncertified chips on a first substrate, and select the first substrate which a quantity of uncertified chips is less than or equal to a first preset quantity, as a certified first substrate;
a first substrate level division unit, configured to: divide the certified first substrate into a second preset quantity of sorting levels according to locations of the uncertified chips on the certified first substrate, and convey the certified first substrate to a display unit process;
a second substrate yield rate detection unit, configured to: detect a quantity of uncertified chips on a second substrate, and select the second substrate which a quantity of uncertified chips is less than or equal to a third preset quantity, as a certified second substrate;
a second substrate level division unit, configured to: divide the certified second substrate into a fourth preset quantity of sorting levels according to locations of the uncertified chips on the certified second substrate, and convey the certified second substrate to the display unit process;
a pairing and combination unit, configured to perform paring and combination on the certified first substrate and the certified second substrate according to the sorting levels; and
a matching degree calculation unit, configured to: calculate a certification matching degree of each paired combination, and select a paired combination whose certification matching degree is greater than a preset ratio and convey the paired combination to an assembly process, wherein
the first substrate and the second substrate are manufactured and formed by arranging a plurality of chips in a form of an array, a chip on the first substrate is a thin film transistor (TFT) glass substrate, and a chip on the second substrate is a color filter.

* * * * *